C. H. TALLMADGE.
METHOD OF PERFORMING DIVISION.
APPLICATION FILED APR. 5, 1909.
1,047,854.
Patented Dec. 17, 1912.
2 SHEETS—SHEET 1.
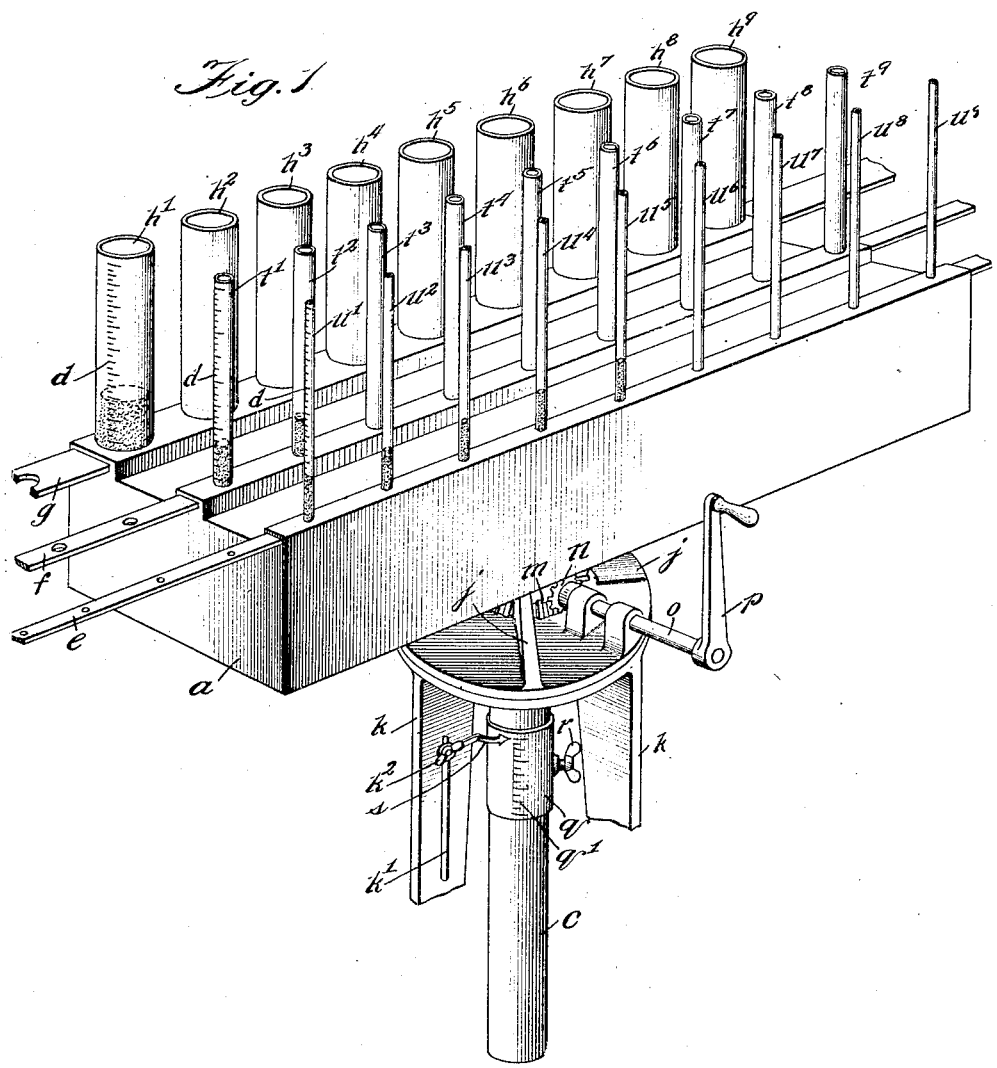
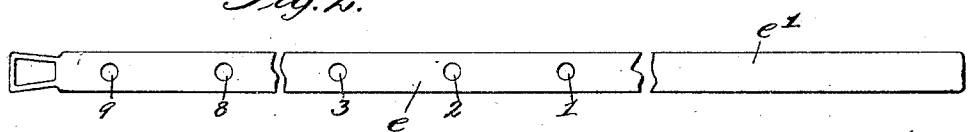
Witnesses:
Inventor:
Charles H. Tallmadge
By Cheever & Cox
Attys

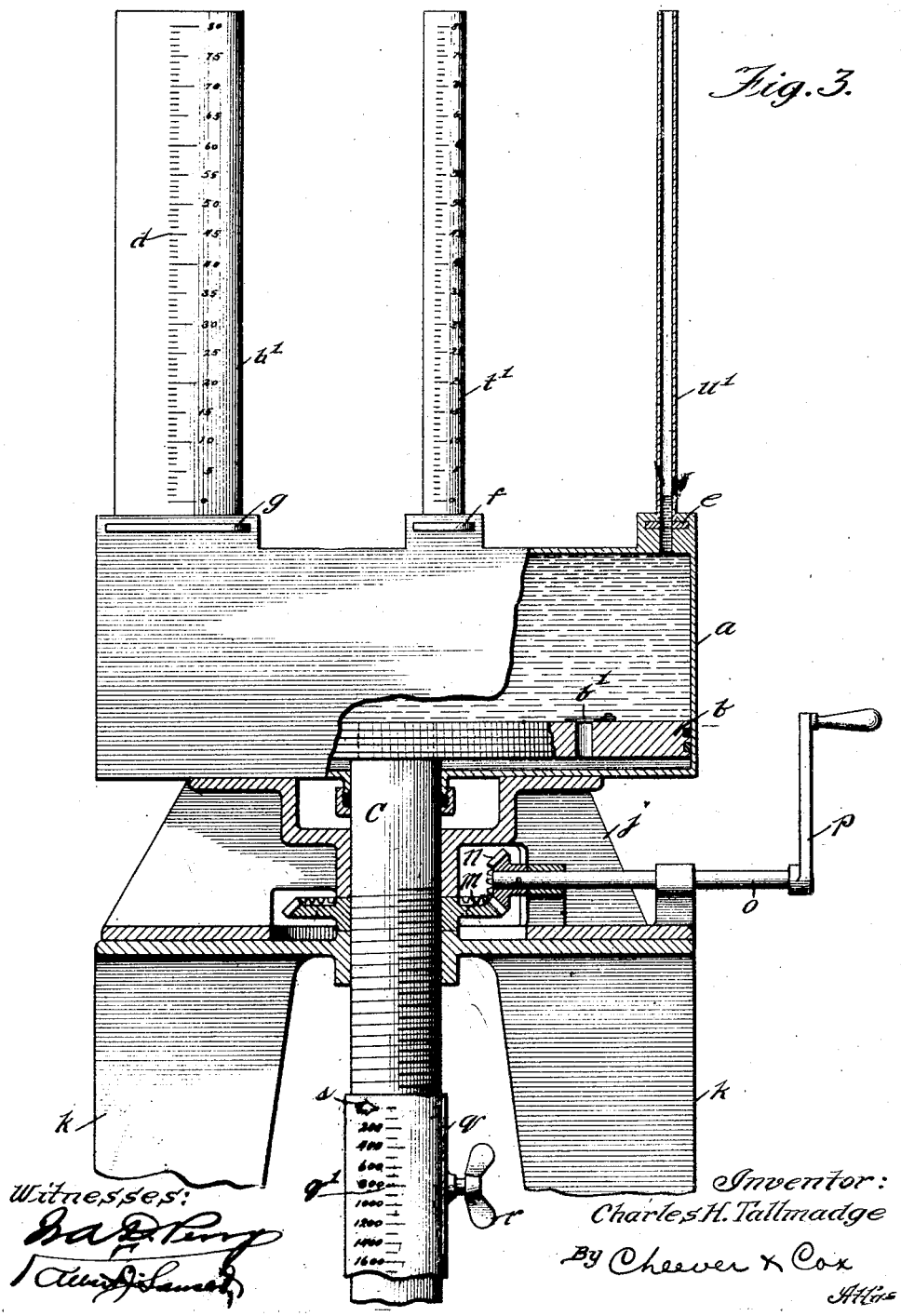

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

METHOD OF PERFORMING DIVISION.

1,047,854.

Specification of Letters Patent.

Patented Dec. 17, 1912.

Application filed April 5, 1909. Serial No. 487,892.

*To all whom it may concern:*

Be it known that I, CHARLES H. TALLMADGE, a citizen of the United States, residing at Chicago, in the county of Cook and State of Illinois, have invented a certain new and useful Method of Performing Division, of which the following is a specification.

My invention relates to the process of obtaining the arithmetical quotient of one number divided by another, and the object of the invention is to provide a method for arriving at the result directly, without any of the intervening steps and processes commonly employed.

My method consists in measuring out or displacing into a receptacle or other measuring device a definite amount of any desired medium, for example a liquid, gas or other suitable physical measurable material, or a measurable force, such as that due to gravity, electricity or the influence of a spring, such definite amount of medium representing the dividend. The aforesaid receptacle or other measuring device is graduated according to the same basis of measurement as is employed in measuring said medium, and in order that said measuring device may constitute a proper "divisor" for the said "dividend" I vary its capacity, or, in the case of a force medium, I vary its coefficient of yield, in such manner that the capacity or yield will bear the same ratio to the amount of medium displaced or force impressed, as the actual numerical divisor does to the actual numerical dividend. The quotient may then be read directly by noting the degree to which the said amount of medium enters or influences the receptacle or measuring device employed.

In order that my method may be more readily understood and practised, I will now give a concrete example of the manner in which it may be practised and for this purpose reference is made to the accompanying drawings, in which:

Figure 1 is a perspective view of an apparatus in which liquid may be employed as the operating medium; Fig. 2 is a top view of a suitable type of valve, and Fig. 3 is a front elevation of the apparatus, partly in section.

Referring to said drawings, in which like reference characters denote similar parts, the receptacle $a$ is provided with a plunger $b$ operated by a rod $c$ or any other suitable device so constructed that it may cause the displacement from the receptacle of a definite quantity of the liquid in any desired amount. It is desirable to provide a valve $b^1$ in said plunger adapted to permit liquid to pass up through it but prevent its passing downward therethrough. By this means if leakage should occur around the edges of the plunger the liquid may be transferred again to the upper side of the plunger by merely lowering the plunger in the receptacle and thus forcing the liquid up through said valve. Communicating with the top of said receptacle are vertical glass tubes of different orders, representing units, tens and hundreds. There are nine tubes $u^1$, $u^2$, $u^3$, etc., in the units order, nine tubes $t^1$, $t^2$, etc. in the tens order and nine tubes $h^1$, $h^2$ and $h^3$ in the hundreds order. As many other orders may be employed as desired. All the tubes in the units order have the same cross sectional area, and the same is true of the tubes in each of the other orders. The cross sectional area of each tube in the tens order is ten times that of a tube in the units order and the cross sectional area of each tube in the hundreds order is ten times that of a tube in the units order and the cross sectional area of each tube in the hundreds order is ten times that of each tube in the tens order. Said tubes are open top and bottom and at the bottom have liquid tight connection with the top of the receptacle $a$.

The front tube of each of the orders is provided with a scale $d$, and the parts are so proportioned that said scales will read in lineal units in the same system of measurement as is employed in measuring the cross sectional area of the tubes and the liquid displaced by the movement of the plunger $b$. For example, if the metric system is employed, a units tube will have a cross sectional area of one square centimeter, and one cubic centimeter and said tube will be graduated in centimeters.

Means are provided at the base or zero point of all the tubes for shutting off communication between them and the receptacle below. Suitable means for this is illustrated in Fig. 2 wherein is shown a sliding valve $e$ having its inner end $e^1$ blank and having holes 1, 2, 3, 4, 5, 6, 7, 8, 9 in its outer end adapted to register with all of the units tubes when the valve is in one extreme position. When said valve is in the other extreme position with the blank portion $e^1$ beneath the tubes they will all be closed. The front tube $u^1$ may be opened by inserting the valve sufficiently to bring the aperture 1 beneath the tube $u^1$. Three or four of the units tubes may be opened by pushing the slide farther in so as to bring three or four of the apertures beneath said units tubes as the case may be. In this way the number of units tubes in communication with the receptacle may be controlled. The tens and hundreds tubes are controlled by other valves $f$ and $g$ in a similar manner.

While the means for operating the plunger to cause it to displace the amount of liquid called for by the terms of the problem may be greatly varied without exceeding the scope of the invention, viewed in its broadest aspect, suitable means are shown in the drawings and will now be described.

The receptacle $a$ is mounted upon a base $j$ supported upon any suitable stand $k$. The rod $c$ is threaded and is raised or lowered by means of a nut $m$ which is rotatable but is held from vertical movement by being located between said base and stand as best shown in Fig. 3. This nut might of course be rotated by hand but in the preferred construction is provided with bevel gear teeth adapted to mesh with the bevel pinion $n$ secured to a shaft $o$ journaled in the base $j$ and rotated by means of a crank $p$ or other suitable mechanism. An important advantage in this construction is that it enables the vertical position of the rod $c$ to be controlled to a nicety.

The operator determines how much vertical movement to give to the rod $c$ and plunger $b$ to displace the proper amount of liquid from the vessel $a$ into the tubes by means of a registering device which may be variously constructed but by preference consists of a member $q$ which is vertically adjustable upon the rod $c$, being held in any desired position by means of the set screw $r$. Said member $q$ is provided with a scale $q^1$ adapted to be read by the aid of a pointer $s$ which is supported upon the stand $k$ and by preference is vertically adjustable as shown in Fig. 1. To obtain vertical adjustment of the pointer the stand has a slot $k^1$ adapted to receive the shank of a set screw $k^2$ as shown.

In operation, let it be assumed that it is desired to divide 500 by 125. The valve $e$ will first be manipulated in such manner that the first five of the units tubes $u^1$, $u^2$, $u^3$, $u^4$ and $u^5$ will be open at the bottom and the remainder of the units tubes closed. The valve $f$ will be brought to such position that the first two tens tubes $t^1$ and $t^2$ will be open at the bottom and the remainder of the tens tubes closed. The slide $g$ will be brought to such position that only the first tube $h^1$ will be open. Under these circumstances it will be seen that there will be open one of the hundreds tubes, two of the tens tubes, and five of the units tubes. This corresponds to the divisor which is 125. The crank $p$ will now be rotated in such a manner as to bring the liquid to a level with the zero points in said open tubes, the plunger $b$ under these circumstances being at or near the bottom of the receptacle. The pointer $s$ and scale member $q$ will then be adjusted to such relative position that the pointer will stand at the zero point on the scale $q^1$. After the machine has thus been "set up" to divide by 125 the crank $p$ will be rotated to raise the plunger until the 500 mark on the scale $q^1$ comes opposite to the pointer. This indicates that 500 units of liquid have been displaced into the open tubes. Thereupon it will be found that the level of the liquid in the open tubes will stand at "4", which it will be observed is the quotient of 500 divided by 125. This reading is made direct, and no intervening or partial processes or mental acts are necessary. The theory will be readily understood, for it is obvious that if two of any given order of tubes are open the liquid will rise only half as high therein as if but one of them were open. This is founded upon the principle that doubling the divisor will halve the quotient.

As a result of my method of dividing not only are the intermediate processes eliminated but the result or quotient is obtained substantially instantaneously and there is, practically speaking, no possibility of error in interpreting the result.

While my method is primarily intended for the ready performance of division it is in a sense adapted for multiplication, for by filling the same tubes as before to a point on the scale $d$ on a level with "4" it would be found upon lowering the plunger to bring the level to "0," that 500 units of liquid would be displaced into the receptacle $a$.

What I claim as new and desire to secure by Letters Patent, is:

1. Calculating apparatus comprising a receptacle for liquid, tubes communicating therewith and provided with means for reading the level of the liquid therein, said tubes being of different sizes, nine tubes to a size, a tube of one size having ten times the cross sectional area of a tube of the next smaller size, means for controlling the communication between said receptacle and the different tubes, and means for displacing a definite quantity of liquid from said receptacle into said tubes.

2. Calculating apparatus comprising a receptacle for liquid, tubes communicating therewith, said tubes being arranged in a plurality of groups nine to a group, one group representing units and another tens, a tube in the tens group having ten times the cross sectional area of a tube in the units group, means for reading the level of liquid in said tubes, means for closing the communication between said receptacle and the different tubes, and means for displacing a definite amount of liquid from said receptacle into said tubes.

3. In calculating apparatus, the combination of a receptacle for liquid, graduated tubes communicating therewith, said tubes being of different sizes, nine to a size, the cross sectional area of any tube of one size being ten times the cross sectional area of a tube of the next smaller size, means for controlling the communication between said receptacle and the different tubes, a plunger for displacing the liquid from said receptacle to said tubes and means for operating said plunger.

4. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of the next smaller size, means for controlling the communication between said receptacle and the different tubes, a plunger for forcing the liquid from said receptacle to said tubes, means for operating said plunger and means whereby the amount of liquid displaced by said plunger into said tubes may be measured.

5. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle into said tubes, a rod for operating said plunger and means connected with said rod for measuring the movement thereof to thereby determine the amount of liquid displaced from said receptacle into said tubes.

6. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between the receptacle and the different tubes, a plunger for forcing the liquid from said receptacle to said tubes, and screw mechanism for operating said plunger.

7. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between the receptacle and the different tubes, a plunger for forcing the liquid from said receptacle to said tubes, and means adapted to operate said plunger to displace a definite amount of liquid from said receptacle into said tubes, the plunger-operating means comprising a rod connected to said plunger, a nut screwing onto said rod and held from movement in the direction of travel of the plunger, and means for rotating said nut.

8. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between the receptacle and the different tubes, a plunger for forcing the liquid from said receptacle to said tubes, and means adapted to operate said plunger to displace a definite amount of liquid from said receptacle into said tubes, the plunger-operating means comprising a rod connected to said plunger, a nut screwing onto said rod and held from movement in the direction of travel of the plunger, and hand operated gearing for rotating said nut.

9. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle to said tubes, means for operating said plunger, and a registering device for indicating the amount of liquid displaced by said plunger into said tubes, said registering device comprising two members one of which is stationary and the other is adapted to move with said plunger, one of the members of said registering device having a graduated scale thereon.

10. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle to said tubes, means for operating said plunger, and two coöperating members for registering the amount of liquid displaced from said receptacle, one of said coöperative members being adjustable with reference to said plunger.

11. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle to said tubes, means for operating said plunger, and two coöperative members for registering the amount of liquid displaced from said receptacle, one of said coöperating members being stationary and adjustable and the other moving with the plunger.

12. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle to said tubes, means for operating said plunger, and two coöperative members for registering the amount of liquid displaced from said receptacle, one of said coöperative members being stationary and the other being adapted to move with the plunger and being adjustable relatively thereto.

13. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle to said tubes, means for operating said plunger, and two coöperative members for registering the amount of liquid displaced from said receptacle, one of said members being stationary and the other movable with the plunger and both being adjustable substantially as described.

14. In calculating apparatus, the combination of a receptacle for liquid, tubes communicating therewith and provided with means for reading the level of the liquid therein, said tubes being of different sizes, nine tubes to a size, a tube of one size having ten times the cross sectional area of a tube of smaller size, means for controlling the communication between said receptacle and the different tubes, a plunger for forcing the liquid from said receptacle into said tubes, a piston rod for operating said plunger, a scale member adjustably mounted on said rod and a pointer for indicating the readings on said scale member.

15. Calculating apparatus comprising a receptacle for liquid, tubes communicating therewith and provided with means for reading the level of the liquid therein, said tubes being of different sizes, nine tubes to a size, a tube of one size having ten times the cross sectional area of a tube of the next smaller size, hand operated valves for shutting off the communication between said receptacle and the different tubes and means for displacing a definite quantity of liquid from said receptacle into said tubes.

In witness whereof, I have hereunto subscribed my name in the presence of two witnesses.

CHARLES H. TALLMADGE.

Witnesses:
 HOWARD M. COX,
 C. J. CHRISTOFFEL.